(12) United States Patent
Mignogna et al.

(10) Patent No.: US 11,407,844 B2
(45) Date of Patent: Aug. 9, 2022

(54) CATALYST COMPONENTS FOR THE POLYMERIZATION OF OLEFINS

(71) Applicant: BASELL POLIOLEFINE ITALIA S.R.L., Milan (IT)

(72) Inventors: Alessandro Mignogna, Ferrara (IT); Dario Liguori, Ferrara (IT); Giampiero Morini, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 17/312,264

(22) PCT Filed: Dec. 3, 2019

(86) PCT No.: PCT/EP2019/083487
§ 371 (c)(1),
(2) Date: Jun. 9, 2021

(87) PCT Pub. No.: WO2020/120227
PCT Pub. Date: Jun. 18, 2020

(65) Prior Publication Data
US 2022/0033539 A1    Feb. 3, 2022

(30) Foreign Application Priority Data
Dec. 14, 2018 (EP) .................. 18212674

(51) Int. Cl.
*C08F 4/651* (2006.01)
*C08F 10/06* (2006.01)
*C08F 4/659* (2006.01)

(52) U.S. Cl.
CPC .......... *C08F 4/651* (2013.01); *C08F 4/65912* (2013.01); *C08F 10/06* (2013.01)

(58) Field of Classification Search
CPC ................................ C08F 4/651; C08F 10/06
See application file for complete search history.

(56) References Cited

U.S. PATENT DOCUMENTS

2011/0130529 A1    6/2011  Coalter, III et al.

FOREIGN PATENT DOCUMENTS

CN    107428869 A    12/2017
WO    2014184171 A1    11/2014

OTHER PUBLICATIONS

International Search Report and Written Opinion dated Jan. 9, 2020 (Jan. 9, 2020) for Corresponding PCT/EP2019/083487.

*Primary Examiner* — Caixia Lu

(57) ABSTRACT

A solid catalyst component for the polymerization of olefins made from or containing Mg, Ti, Cl and at least an electron donor compound which is the reaction product obtained by bringing into contact a Mg compound and a Ti compound having at least a Ti-halogen bond with an electron donor selected from diphenol derivatives.

15 Claims, No Drawings

CATALYST COMPONENTS FOR THE POLYMERIZATION OF OLEFINS

This application is the U.S. National Phase of PCT International Application PCT/EP2019/083487, filed Dec. 3, 2019, claiming benefit of priority to European Patent Application No. 18212674.8, filed Dec. 14, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the polymerization of olefins made from or containing a Mg dihalide based support on which are supported Ti atoms and an electron donor selected from diphenol derivatives.

BACKGROUND OF THE INVENTION

In some instances, catalysts components are used for the stereospecific polymerization of olefins. Concerning the polymerization of propylene, some catalysts are of the Ziegler-Natta category. In some instances, the Ziegler-Natta catalysts are made from or containing a solid catalyst component, constituted by a magnesium dihalide on which are supported a titanium compound and an internal electron donor compound, used in combination with an Al-alkyl compound. In some instances, an external donor is used to obtain higher crystallinity of the polymer and higher isotacticity. In some instances, internal donors are esters of phthalic acid. In some instances, phthalates are used as internal donors in combination with alkylalkoxysilanes as external donors. Unfortunately, the phthalates have raised health concerns associated with their use.

SUMMARY OF THE INVENTION

In a general embodiment, the present disclosure provides a solid catalyst component for the polymerization of olefins made from or containing Mg, Ti, Cl and at least an electron donor compound which is the reaction product obtained by bringing into contact a Mg compound and a Ti compound having at least a Ti-halogen bond with an electron donor selected from diphenol derivatives of formula (I)

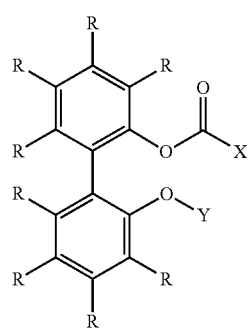

wherein X is a chlorine substituted phenyl group and Y is selected from hydrogen or $R^1$; the R groups, equal to or different from each other, are selected from hydrogen, halogen and $C_1$-$C_{15}$ hydrocarbon groups, optionally containing a heteroatom selected from halogen, P, S, N, O and Si, and $R^1$ is a $C_1$-$C_5$ aliphatic group. In some embodiments, the $C_1$-$C_{15}$ hydrocarbon groups, optionally containing a heteroatom selected from halogen, P, S, N, O and Si, are fused together to form one or more cycles.

DETAILED DESCRIPTION OF THE INVENTION

In some embodiments and in the diphenol of formula (I), at least one of the R groups on the phenyl ring is different from hydrogen and selected from halogen or $C_1$-$C_{15}$ hydrocarbon groups, alternatively at least two of the R groups are different from hydrogen. In some embodiments, at least 3, alternatively at least 4, of the R groups are different from hydrogen. In some embodiments, six of the R groups are different from hydrogen. In some embodiments, the two phenyl rings of the diphenol structure of formula (I) have the same substitution pattern. In some embodiments, the R groups different from hydrogen are in an even number (2, 4, 6, etc.) and distributed equally in number and position on the two phenyl rings. In some embodiments, the R groups different from hydrogen are selected from $C_1$-$C_{15}$ hydrocarbon groups, alternatively from $C_1$-$C_{10}$ alkyl groups. In some embodiments, the R groups different from hydrogen are $C_1$-$C_5$ alkyl groups linear or branched. In some embodiments, the linear alkyl group is methyl. In some embodiments, the branched alkyl group is t-butyl.

In some embodiments, the $R^1$ groups are selected from the group consisting of hydrogen and linear $C_1$-$C_5$ alkyl groups. In some embodiments, the linear $C_1$-$C_5$ alkyl groups are selected from the group consisting of methyl, ethyl and propyl. In some embodiments, the $R^1$ groups are selected from the group consisting of hydrogen and methyl.

In some embodiments, the chlorine substituted phenyl group denoted as X contains one or more chlorine atoms. In some embodiments, the phenyl group is chlorine monosubstituted.

In some embodiments, the chlorine atom is in ortho position. In some embodiments, $R^1$ is hydrogen and a chlorine is in ortho position.

In some embodiments, two or more chlorines are present, with at least one chlorine is in ortho position. In some embodiments, two or more chlorines are present, with at least one chlorine is in ortho position and the remaining chlorine(s) is(are) in meta or para position. In some embodiments, two or more chlorines are present, with at least one chlorine is in ortho position and a remaining chlorine is in the meta position. In some embodiments, two chlorines are present. In some embodiments, the phenyl group, in addition to the chlorine substitution, also contains a $C_1$-$C_5$ alkyl group substituent.

In some embodiments, a diphenol derivative of formula (I) is selected from the group consisting of 6'-methoxy-2', 3',5,6-tetramethyl-[1,1'-biphenyl]-2-yl 2-chlorobenzoate, 2',3',5,6-tetramethyl-6'-propoxy-[1,1'-biphenyl]-2-yl 2-chlorobenzoate, 6'-hydroxy-2',3',5,6-tetramethyl-[1,1'-biphenyl]-2-yl 2-chlorobenzoate, 6'-hydroxy-2',3',5,6-tetramethyl-[1,1'-biphenyl]-2-yl 2,3-dichlorobenzoate, 2',3',5,6-tetramethyl-6'-propoxy-[1,1'-biphenyl]-2-yl 2,3-dichlorobenzoate, 6'-methoxy-2',3',5,6-tetramethyl-[1,1'-biphenyl]-2-yl 2,3-dichlorobenzoate, 6'-ethoxy-2',3',5,6-tetramethyl-[1,1'-biphenyl]-2-yl 2,3-dichlorobenzoate, 6'-methoxy-2',3',5,6-tetramethyl-[1,1'-biphenyl]-2-yl 3,4-dichlorobenzoate, 2',3',5,6-tetramethyl-6'-propoxy-[1,1'-biphenyl]-2-yl 3,4-dichlorobenzoate, 6'-hydroxy-2',3',5,6-tetramethyl[1,1'-biphenyl]-2-yl 3,4-dichlorobenzoate, 6'-ethoxy-2',3',5,6-tetramethyl-[1,1'-biphenyl]-2-yl 3,4-dichlorobenzoate, 6'-hydroxy-2',3',5,6-tetramethyl-[1,1'-biphenyl]-2-yl 2,5-dichlorobenzoate, 2',3',5,6-tetramethyl-6'-propoxy-[1,1'-biphenyl]-2-yl 2,5-dichlorobenzoate, 6'-ethoxy-2',3',5,6-tetramethyl-[1,1'-biphenyl]-2-yl 2,5-dichlorobenzoate, 6'-methoxy-2',3',5,6-tetramethyl-[1,1'-biphenyl]-2-yl 2,5-dichlorobenzoate, 6'-ethoxy-2',3',5,6-tetramethyl-[1,1'-biphenyl]-2-yl 2,4-dichlorobenzoate, 2',3',5,6-tetramethyl-6'-propoxy-[1,1'-biphenyl]-2-yl 2,4-dichlorobenzoate, 6'-hydroxy-2',3',5,6-tetramethyl-[1,1'-biphenyl]-2-yl 2,4-dichlorobenzoate, 6'-methoxy-2',3',5,6-tetramethyl-[1,1'-biphenyl]-2-yl 2,4-dichlorobenzoate, 6'-hydroxy-2',3',5,6-tetramethyl-[1,1'-biphenyl]-2-yl 2,4,6-trichlorobenzoate, 6'-ethoxy-2',3',5,6-tetramethyl-[1,1'-biphenyl]-2-yl 2,4,6-trichlorobenzoate, 6'-methoxy-2',3',5,6-tetramethyl-[1,1'-biphenyl]-2-yl 2,4,6-trichlorobenzoate, 2',3',5,6-tetramethyl-6'-propoxy-[1,1'-biphenyl]-2-yl 2,4,6-trichlorobenzoate, 2',3',5,6-tetramethyl-6'-propoxy-[1,1'-biphenyl]-2-yl 3,5-dichlorobenzoate, 6'-hydroxy-2',3',5,6-tetramethyl[1,1'-biphenyl]-2-yl 3,5-dichlorobenzoate, 6'-ethoxy-2',3',5,6-tetramethyl-[1,1'-biphenyl]-2-yl 3,5-dichlorobenzoate, 6'-methoxy-2',3',5,6-tetramethyl-[1,1'-biphenyl]-2-yl 3,5-dichlorobenzoate, 6'-hydroxy-2',3',5,6-tetramethyl-[1, l'-biphenyl]-2-yl 2,6-dichlorobenzoate, 2',3',5,6-tetramethyl-6'-propoxy-[1,1'-biphenyl]-2-yl 2,6-dichlorobenzoate, 6'-ethoxy-2',3',5,6-tetramethyl-[1,1'-biphenyl]-2-yl 2,6-dichlorobenzoate, 6'-methoxy-2',3',5,6-tetramethyl-[1,1'-biphenyl]-2-yl 2,6-dichlorobenzoate, 2',3',5,6-tetramethyl-6'-propoxy-[1, l'-biphenyl]-2-yl 3-chlorobenzoate, 6'-hydroxy-2',3',5,6-tetramethyl-[1,1'-biphenyl]-2-yl 3-chlorobenzoate, 6'-ethoxy-2',3',5,6-tetramethyl-[1,1'-biphenyl]-2-yl 3-chlorobenzoate, 6'-methoxy-2',3',5,6-tetramethyl-[1,1'-biphenyl]-2-yl 3-chlorobenzoate, 6'-hydroxy-2',3',5,6-tetramethyl-[1,1'-biphenyl]-2-yl 4-chlorobenzoate, 6'-methoxy-2',3',5,6-tetramethyl-[1,1'-biphenyl]-2-yl 4-chlorobenzoate, 6'-ethoxy-2',3',5,6-tetramethyl-[1,1'-biphenyl]-2-yl 4-chlorobenzoate, 2',3',5,6-tetramethyl-6'-propoxy-[1,1'-biphenyl]-2-yl 4-chlorobenzoate, 2'-hydroxy-[1,1'-biphenyl]-2-yl 2-chlorobenzoate, 2'-methoxy-[1,1'-biphenyl]-2-yl 3-chlorobenzoate, 2'-hydroxy-[1,1'-biphenyl]-2-yl 2,4-dichlorobenzoate, 2'-ethoxy-[1,1'-biphenyl]-2-yl 3-chlorobenzoate, 2'-methoxy-[1,1'-biphenyl]-2-yl 2,4-dichlorobenzoate, 2'-hydroxy-[1,1'-biphenyl]-2-yl 3,4-dichlorobenzoate, 2'-methoxy-[1,1'-biphenyl]-2-yl 2-chlorobenzoate, 2'-hydroxy-[1,1'-biphenyl]-2-yl 3,4-dichlorobenzoate, 2'-hydroxy-[1,1'-biphenyl]-2-yl 3-chlorobenzoate, 2'-hydroxy-[1,1'-biphenyl]-2-yl 4-chlorobenzoate, 2'-methoxy-[1,1'-biphenyl]-2-yl 4-chlorobenzoate, 2'-ethoxy-[1,1'-biphenyl]-2-yl 2-chlorobenzoate, 2'-ethoxy-[1,1'-biphenyl]-2-yl 4-chlorobenzoate, 2'-methoxy-[1,1'-binaphthalen]-2-yl 3-chlorobenzoate, 2'-methoxy-[1,1'-binaphthalen]-2-yl 2-chlorobenzoate, 2'-hydroxy-[1,1'-binaphthalen]-2-yl 3-chlorobenzoate, 2'-hydroxy-[1,1'-binaphthalen]-2-yl 2-chlorobenzoate, 2'-ethoxy-[1,1'-binaphthalen]-2-yl 3-chlorobenzoate, 2'-ethoxy-[1,1'-binaphthalen]-2-yl 2-chlorobenzoate, 2'-ethoxy-[1,1'-binaphthalen]-2-yl 4-chlorobenzoate, 2'-hydroxy-5,5',6,6',7,7', 8,8'-octahydro-[1,1'-binaphthalen]-2-yl 3,4-dichlorobenzoate, 2'-hydroxy-5',6-dimethyl-[1,1'-biphenyl]-2-yl 2-chlorobenzoate, 2'-hydroxy-5',6-dimethyl-[1,1'-biphenyl]-2-yl 3-chlorobenzoate, 2'-hydroxy-5,5',6,6',7,7',8,8'-octahydro-[1,1'-binaphthalen]-2-yl 2,3-dichlorobenzoate, 2'-hydroxy-6,6'-dimethyl-[1,1'-biphenyl]-2-yl 2-chlorobenzoate, and 2'-methoxy-6,6'-dimethyl-[1,1'-biphenyl]-2-yl 3-chlorobenzoate.

In some embodiments, the diphenol derivatives of formula (I) are added during the catalyst preparation process. In some embodiments, precursors of the diphenol derivatives of formula (I), which react with other catalyst ingredients and transform into the diphenol derivatives of formula (I), are added during the catalyst preparation process. In some embodiments, the solid catalyst components are further made from or containing additional donors. In some embodiments, the additional donors are selected from the group consisting of esters of benzoic acids. In some embodiments, the esters of benzoic acids are substituted with halogen or $C_1$-$C_{15}$ hydrocarbon groups on the phenyl ring.

In some embodiments, the catalyst components are made from or containing the above-described electron donors, Ti, Mg and halogen. In some embodiments, the catalyst components are made from or containing a titanium compound, having at least a Ti-halogen bond and the electron donor compounds supported on a Mg halide. In some embodiments, the magnesium halide is $MgCl_2$ in active form.

In some embodiments, the titanium compounds are selected from the group consisting of $TiCl_4$, $TiCl_3$, and Ti-haloalcoholates of formula $Ti(OR)_{m-y}X_y$, wherein m is the valence of titanium, y is a number between 1 and m−1, X is halogen and R is a hydrocarbon radical having from 1 to 10 carbon atoms.

In some embodiments, the solid catalyst component contains Ti atoms in an amount higher than 2.5% wt, alternatively higher than 3.0% wt, with respect to the total weight of the catalyst component. In some embodiments, the amount of titanium atoms range from 2.5 to 8% wt, with respect to the total weight of the catalyst component.

In some embodiments, the solid catalyst component is prepared by the reaction between magnesium alcoholates or chloroalcoholates and an excess of $TiCl_4$ in the presence of the electron donor compounds at a temperature of about 80 to 120° C. In some embodiments, the chloroalcoholates are prepared as described in U.S. Pat. No. 4,220,554.

In some embodiments, the solid catalyst component is prepared by reacting a titanium compound of formula $Ti(OR)_{m-y}X_y$, where m is the valence of titanium and y is a number between 1 and m with a magnesium chloride deriving from an adduct of formula $MgCl_2.pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts are as disclosed in U.S. Pat. Nos. 4,399,054 and 4,469,648. In some embodiments, the adduct is directly reacted with Ti compound or subjected to thermal controlled dealcoholation (80-130° C.), thereby obtaining an adduct in which the number of moles of alcohol is lower than 3, alternatively between 0.1 and 2.5. In some embodiments, the reaction with the Ti compound is carried out by suspending the adduct (dealcoholated or as such) in cold $TiCl_4$. In some embodiments, the temperature of the cold $TiCl_4$ is 0° C. The mixture is heated up to 80-130° C. and kept at this temperature for 0.5-2 hours. In some embodiments, the treatment with $TiCl_4$ is carried out one or more times. In some embodiments, the electron donor compound is added during the first treatment with $TiCl_4$ in an amount to provide a Mg/donor ratio in the range of 2 to 15, alternatively from 4 to 10. In some embodiments, the addition of additional donors is split. In some embodiments, the additional donor is added during the first treatment with $TiCl_4$ while the donor of formula (I) is added during a second treatment with $TiCl_4$. In some embodiments, the preparation of catalyst components in spherical form occurs as described in European Patent Applications EP-A-395083, EP-A-553805, EP-A-553806, EP-A-601525 or Patent Cooperation Treaty Publication No. WO98/44009.

In some embodiments, the solid catalyst components show a surface area (by B.E.T. method) between 20 and 500 $m^2/g$, alternatively between 50 and 400 $m^2/g$, and a total porosity (by B.E.T. method) higher than 0.2 $cm^3/g$, alternatively between 0.2 and 0.6 $cm^3/g$. In some embodiments, the porosity (Hg method) due to pores with radius up to 10.000 Å ranges from 0.3 to 1.5 $cm^3/g$, alternatively from 0.45 to 1 $cm^3/g$.

In some embodiments, the solid catalyst component has an average particle size ranging from 5 to 120 µm, alternatively from 10 to 100 µm.

In some embodiments, the final amount of the electron donor compound of formula (I) provides a molar ratio with respect to the Ti atoms from 0.01:1 to 2:1, alternatively from 0.05:1 to 1.2:1.

In some embodiments, the solid catalyst components is converted into catalysts for the polymerization of olefins by reacting the solid catalyst components with organoaluminum compounds.

In some embodiments, the present disclosure provides a catalyst for the polymerization of olefins $CH_2$=CHR, wherein R is hydrogen or a hydrocarbyl radical with 1-12 carbon atoms, made from or containing the product obtained by contacting:
(i) the solid catalyst component and
(ii) an alkylaluminum compound and optionally,
(iii) an external electron donor compound.

In some embodiments, the alkyl-Al compound (ii) is a trialkyl aluminum compound. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the alkyl-Al compound (ii) is selected from alkylaluminum halides, alkylaluminum hydrides, alkylaluminum sesquichlorides, or mixtures with trialkylaluminums. In some embodiments, the alkylaluminum sesquichlorides is $AlEt_2Cl$ or $Al_2Et_3Cl_3$.

In some embodiments, the external electron-donor compounds are selected from the group consisting of silicon compounds, ethers, esters, amines, heterocyclic compounds, and ketones. In some embodiments, the external electron-donor compound is 2,2,6,6-tetramethylpiperidine.

In some embodiments, the external donor compounds are silicon compounds of formula $(R_7)_a(R_8)_bSi(OR_9)_c$, where a and b are integers from 0 to 2, c is an integer from 1 to 4 and the sum (a+b+c) is 4; $R_7$, $R_8$, and $R_9$, are radicals with 1-18 carbon atoms optionally containing heteroatoms. In some embodiments, the external donor compounds are silicon compounds wherein a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group. In some embodiments, $R_9$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxy silane, (2-ethylpiperidinyl) thexyldimethoxysilane, (3,3,3-trifluoro-n-propyl) (2-ethylpiperidinyl)dimethoxysilane, methyl(3,3,3-trifluoro-n-propyl)dimethoxysilane, and N,N-diethylaminotriethoxysilane. In some embodiments, the external donor compounds are silicon compounds wherein a is 0, c is 3, $R_8$ is a branched alkyl or cycloalkyl group, optionally containing heteroatoms, and $R_9$ is methyl. In some embodiments, the silicon compounds are selected from the group consisting of cyclohexyltrimethoxysilane, t-butyltrimethoxysilane and thexyltrimethoxysilane.

In some embodiments, the amount of electron donor compound (iii) provides a molar ratio between the organoaluminum compound and the electron donor compound (iii) of from 0.1:1 to 500:1, alternatively from 1:1 to 300:1, alternatively from 3:1 to 100:1.

In some embodiments, the present disclosure provides a process for the homopolymerization or copolymerization of olefins $CH_2$=CHR, wherein R is hydrogen or a hydrocarbyl radical with 1-12 carbon atoms, carried out in the presence of a catalyst made from or containing the product of the reaction between:
(i) the solid catalyst component;
(ii) an alkylaluminum compound and,
(iii) optionally an electron-donor compound (external donor).

In some embodiments, the polymerization process is carried out in a slurry polymerization using as diluent an inert hydrocarbon solvent, or in bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at temperature of from 20 to 120° C., alternatively from 40 to 80° C. In some embodiments, the polymerization is carried out in gas-phase with an operating pressure ranging between 0.5 and 5 MPa, alternatively between 1 and 4 MPa. In some embodiments, the polymerization is carried out in a bulk polymerization with the operating pressure ranging between 1 and 8 MPa, alternatively between 1.5 and 5 MPa.

In some embodiments, the catalyst simultaneously gives very high activity, (over 70 kg of polymer per g of catalyst) with an isotactic index (XI %) over 97.5%.

The following examples are given to illustrate the disclosure without limiting it.

EXAMPLES

Characterization

Determination of X.I.

2.5 g of polymer and 250 ml of o-xylene were placed in a round-bottomed flask provided with a cooler and a reflux condenser and kept under nitrogen. The mixture was heated to 135° C. and kept under stirring for about 60 minutes. The final solution cooled to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Melt Flow Rate (MFR)

The melt flow rate MIL of the polymer was determined according to ISO 1133 (230° C., 2.16 Kg).

Comparative Example 1: synthesis of 6'-hydroxy-2', 3',5,6-tetramethyl-[1,1'-biphenyl]-2-yl benzoate First Step: Synthesis of 2-(tert-butyl)-3,4-dimethylphenol Into a 1 L round bottom flask under nitrogen were added 3,4-dimethylphenol (100 g, 0.82 mol), 2-chloro-2-methylpropane (267 mL, 3 eq.) and sulfuric acid (1.3 mL, 3% mol). The mixture was refluxed until GC showed that the reaction was complete (10 hours). After this time, the flask was cooled to room temperature. 400 mL of water were added together with 300 mL of toluene under stirring. The organic layer was separated and washed with water (2×150 mL), NaHCO$_3$(aq) and again with water. The toluene solution was used in the next step.

Second Step: Synthesis of 3,3'-di-tert-butyl-5,5',6, 6'-tetramethyl-[1,1'-biphenyl]-2,2'-diol The toluene solution of 2-(tert-butyl)-3,4-dimethylphenol from the previous step was charged into a 1 L round bottom flask with Cu(I)Cl (4.9 g, 6% mol), N,N,N',N'-tetramethylethylenediamine (11.1 mL, 9% mol) and water (1.8 mL, 12% mol). Air was bubbled through a porous frit into the mixture under stirring at room temperature until GC showed that the reaction was complete (7 hours). Acidic water was added under stirring. The organic layer was separated and washed with water until neutral pH, anhydrified over Na$_2$SO$_4$, and solvent was distilled off to afford 138 g of solid (yield 93% over two steps).

Third Step: Synthesis of 5,5',6,6'-tetramethyl-[1,1'-biphenyl]-2,2'-diol 3,3'-di-tert-butyl-5,5',6,6'-tetramethyl-[1,1'-biphenyl]-2, 2'-diol obtained in the previous step (138 g, 0.39 mol) was charged into a 1 L round bottom flask equipped with a mechanical stirrer, together with toluene (390 mL, 1 mol/L) under nitrogen, then cooled to 0° C. AlCl$_3$ (52 g, 1 eq) was added portionwise. The slurry was stirred at room temperature until GC showed that the reaction was complete (50 minutes) then cooled with an ice/water bath. 200 mL of HCl 4 M were added. The slurry was filtered on a sintered glass funnel and washed thoroughly with water (500 mL×3), NaHCO$_3$(aq) and i-hexanes (300 mL×2). The wet solid was vacuum-dried at 80° C. overnight to afford 90 g of GC pure white solid (96% of yield).

Fourth Step: Synthesis of 6'-hydroxy-2',3',5,6-tetramethyl-[1,1'-biphenyl]-2-yl benzoate 5,5',6,6'-tetramethyl[1,1'-biphenyl]-2,2'-diol (10 g, 0.041 mol) was charged into a 500 mL round bottom flask equipped with a mechanical stirrer under nitrogen with toluene (200 mL, 0.2 mol/L), TiCl$_4$ (4.8 mL, 1.2 eq) and benzoyl chloride (5 mL, 1.05 eq). After 6 hours of stirring at room temperature, the dark red powder was filtered under nitrogen and washed with toluene (2×100 mL), then treated with acidic water/diethyl ether under vigorous stirring until red coloration disappeared. The organic layer was separated and washed with water until neutral pH, anhydrified over Na$_2$SO$_4$. The solvent was distilled off to afford 13 g of pale-yellow thick oil (99% purity GC, 91% yield).

Example 1—Synthesis of 6'-hydroxy-2',3',5,6-tetramethyl[1,1'-biphenyl]-2-yl 2-chlorobenzoate The synthesis of 6'-hydroxy-2',3',5,6-tetramethyl-[1,1'-biphenyl]-2-yl 2-chlorobenzoate was the same as comparative example 1, fourth step, except that 2-chlorobenzoyl chloride was used instead of benzoyl chloride.

Example 2—Synthesis of 6'-hydroxy-2',3',5,6-tetramethyl-[1,1'-biphenyl]-2-yl 2,3-dichlorobenzoate The synthesis of 6'-hydroxy-2',3',5,6-tetramethyl-[1,1'-biphenyl]-2-yl 2,3-dichlorobenzoate was the same as comparative example 1, fourth step, except that 2,3-dichlorobenzoyl chloride was used instead of benzoyl chloride.

Example 3—Synthesis of 6'-hydroxy-2',3',5,6-tetramethyl-[1,1'-biphenyl]-2-yl 2,4-dichlorobenzoate The synthesis of 6'-hydroxy-2',3',5,6-tetramethyl-[1,1'-biphenyl]-2-yl 2,4-dichlorobenzoate was the same as comparative example 1, except that 2,4-dichlorobenzoyl chloride was used instead of benzoyl chloride.

Example 4—Synthesis of 6'-methoxy-2',3',5,6-tetramethyl-[1,1'-biphenyl]-2-yl 3-chlorobenzoate First Step: Synthesis of 6'-hydroxy-2',3',5,6-tetramethyl-[1,1'-biphenyl]-2-yl 3-chlorobenzoate The synthesis of 6'-hydroxy-2',3',5,6-tetramethyl-[1,1'-biphenyl]-2-yl 3-chlorobenzoate was the same as comparative example 1, fourth step, except that 3-chlorobenzoyl chloride was used instead of benzoyl chloride.

Second Step: Synthesis of 6'-methoxy-2',3',5,6-tetramethyl-[1,1'-biphenyl]-2-yl 3-chlorobenzoate 6'-hydroxy-2',3',5,6-tetramethyl-[1,1'-biphenyl]-2-yl 3-chlorobenzoate (12 g, 0.032 mol) was charged into a 500 mL round bottom flask equipped with a magnetic stirrer under nitrogen with THF (150 mL, 0.2 mol/L) and methyl iodide (5.9 mL, 3 eq). The mixture was cooled down to 0° C. with an ice/water bath. NaH (1.1 mol, 1.1 eq) was added portionwise. After 3 hours at room temperature, the mixture was quenched with acidic water under stirring and extracted with diethyl ether. The organic. Solvent was distilled off to afford 12.1 g of thick oil which was crystalized from 24 mL of diisopropyl ether to obtain 8.6 g of pure product (70% yield).

Example 5—Synthesis of 6'-methoxy-2',3',5,6-tetramethyl-[1,1'-biphenyl]-2-yl 4-chlorobenzoate The synthesis of 6'-methoxy-2',3',5,6-tetramethyl-[1,1'-biphenyl]-2-yl 4-chlorobenzoate was the same as Example 4, second step, except that 6'-hydroxy-2',3',5,6-tetramethyl-[1,1'-biphenyl]-2-yl 4-chlorobenzoate was used instead of 6'-hydroxy-2',3',5,6-tetramethyl-[1,1'-biphenyl]-2-yl 3-chlorobenzoate.

Comparative Example 2—Synthesis of 6'-methoxy-2',3',5,6-tetramethyl-[1,1'-biphenyl]-2-yl benzoate The synthesis of 6'-methoxy-2',3',5,6-tetramethyl-[1,1'-biphenyl]-2-yl benzoate was the same of Example 4, second step, except that 6'-hydroxy-2',3',5,6-tetramethyl-[1,1'-biphenyl]-2-yl benzoate was used instead of 6'-hydroxy-2',3',5,6-tetramethyl-[1,1'-biphenyl]-2-yl 3-chlorobenzoate General Procedure for Preparation of the Spherical Adducts An initial amount of microspheroidal $MgCl_2 \cdot 2.8 C_2H_5OH$ was prepared according to the method described in Example 2 of Patent Cooperation Treaty Publication No. WO98/44009, but operating on a larger scale.

Procedure for the Preparation of the Solid Catalyst Component Using Donors from Comparative Example 1 and Examples 1-3

Into a 500 mL round bottom flask, equipped with mechanical stirrer, cooler and thermometer 250 mL of $TiCl_4$ were introduced at room temperature under nitrogen atmosphere. After cooling to 0° C., while stirring, ethyl benzoate and 10.0 g of the spherical adduct were sequentially added into the flask. The amount of charged ethyl benzoate was to meet a Mg/EB molar ratio of 6. The temperature was raised to 40° C., and the internal donor was added. The amount of charged internal donor was to meet a Mg/donor molar ratio of 6. Then the temperature was raised to 100° C. and maintained for 2 hours. Thereafter, stirring was stopped. The solid product settled. The supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again. The solid settled. The supernatant liquid was siphoned off.

The solid was washed with anhydrous hexane six times (6×100 mL) in temperature gradient down to 60° C. and one time (100 mL) at room temperature. The solid was then dried under vacuum and analyzed.

Procedure for the Preparation of the Solid Catalyst Component Using Donors from Comparative Example 2 and Examples 4-5

Into a 500 mL round bottom flask, equipped with mechanical stirrer, cooler and thermometer 250 mL of $TiCl_4$ were introduced at room temperature under nitrogen atmosphere. After cooling to 0° C., while stirring, the internal donor and 10.0 g of the spherical adduct were sequentially added into the flask. The amount of charged internal donor was to meet a Mg/donor molar ratio of 6. The temperature was raised to 100° C. and maintained for 2 hours. Thereafter, stirring was stopped. The solid product settled. The supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again. The solid settled. The supernatant liquid was siphoned off.

The solid was washed with anhydrous hexane six times (6×100 mL) in temperature gradient down to 60° C. and one time (100 mL) at room temperature. The solid was then dried under vacuum and analyzed.

General Procedure for the Polymerization of Propylene

A 4-liter steel autoclave equipped with a stirrer, pressure gauge, thermometer, catalyst feeding system, monomer feeding lines and thermostatic jacket, was purged with nitrogen flow at 70° C. for one hour. Then, at 30° C. under propylene flow, the autoclave was charged in sequence with 75 mL of anhydrous hexane, 0.76 g of $AlEt_3$, the external electron donor indicated in Table 1 (if used) and 0.006÷0.010 g of solid catalyst component. The autoclave was closed; subsequently 2.0 NL of hydrogen were added. Then, under stirring, 1.2 kg of liquid propylene was fed. The temperature was raised to 70° C. in five minutes. The polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

Examples 1-5 and Comparative Examples 1-2

The results are listed in Table 1.

TABLE 1

| Ex. | Internal Donor Name | ED | Polymerization Mileage kg/g | XI % wt | MIL g/10' |
|---|---|---|---|---|---|
| C1 | 6'-hydroxy-2',3',5,6-tetramethyl-[1,1'-biphenyl]-2-yl benzoate | D | 67 | 98.3 | 2.6 |
| 1 | 6'-hydroxy-2',3',5,6-tetramethyl-[1,1'-biphenyl]-2-yl 2-chlorobenzoate | D | 86 | 98.3 | 1.1 |
| 2 | 6'-hydroxy-2',3',5,6-tetramethyl-[1,1'-biphenyl]-2-yl 2,3-dichlorobenzoate | D | 86 | 98.4 | 0.9 |
| 3 | 6'-hydroxy-2',3',5,6-tetramethyl-[1,1'-biphenyl]-2-yl 2,4-dichlorobenzoate | D | 75 | 98.6 | 1.1 |
| 4 | 6'-methoxy-2',3',5,6-tetramethyl-[1,1'-biphenyl]-2-yl 3-chlorobenzoate | D | 89 | 97.7 | 3.6 |
| 5 | 6'-methoxy-2',3',5,6-tetramethyl-[1,1'-biphenyl]-2-yl 4-chlorobenzoate | D | 88 | 98.2 | 2.3 |
| C2 | 6'-methoxy-2',3',5,6-tetramethyl-[1,1'-biphenyl]-2-yl benzoate | D | 86 | 96.5 | 2.0 |

ED: External Donor.
D: dicyclopentyldimethoxysilane

What is claimed is:

1. A solid catalyst component for the polymerization of olefins comprising Mg, Ti, Cl and at least an electron donor compound which is the reaction product obtained by bringing into contact a Mg compound and a Ti compound having at least a Ti-halogen bond with an electron donor selected from diphenol derivatives of formula (I)

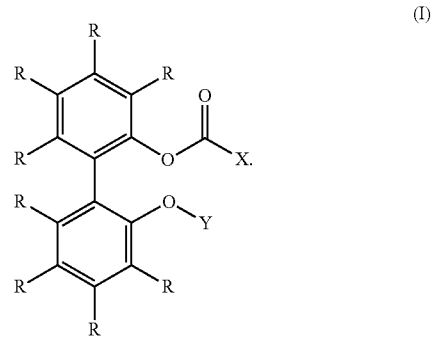

(I)

wherein X is a chlorine substituted phenyl group, and Y is selected from hydrogen or $R^1$; the R groups, equal to or different from each other, are selected from hydrogen, halogen or $C_1$-$C_{15}$ hydrocarbon groups, optionally containing a heteroatom selected from halogen, P, S, N, O or Si, which are optionally fused together to form one or more cycles, and $R^1$ is a $C_1$-$C_5$ aliphatic group.

2. The solid catalyst component according to claim 1, wherein $R^1$ groups are selected from the group consisting of hydrogen and linear $C_1$-$C_5$ alkyl groups.

3. The solid catalyst component according to claim 2, wherein $R^1$ groups are selected from the group consisting of hydrogen and methyl.

4. The solid catalyst component according to claim 1, wherein X is a chlorine monosubstituted phenyl group.

5. The solid catalyst component according to claim 4, wherein the chlorine atom is in ortho position.

6. The solid catalyst component according to claim 3, wherein which $R^1$ is hydrogen and the chlorine is in ortho position.

7. The solid catalyst component according to claim 1, wherein X is a phenyl group containing two or more chlorines.

8. The solid catalyst component according to claim 7, wherein at least one of the chlorines is in ortho position and the remaining chlorine(s) is(are) in meta or para position.

9. The solid catalyst component according to claim 1, wherein at least one of the R groups is different from hydrogen and selected from halogen or $C_1$-$C_{15}$ hydrocarbon groups.

10. The solid catalyst component according to claim 9, wherein at least 4 of the R groups are different from hydrogen.

11. The solid catalyst component according to claim 5, wherein R groups different from hydrogen are selected from $C_1$-$C_{10}$ alkyl groups.

12. The solid catalyst component according to claim 1, further comprising an additional electron donor compound selected from esters of benzoic acids, and wherein the esters of benzoic acid are optionally substituted with halogen or $C_1$-$C_{15}$ hydrocarbon groups on the phenyl ring.

13. A catalyst for the polymerization of olefins $CH_2=CHR$, wherein R is hydrogen or a hydrocarbyl radical with 1-12 carbon atoms, comprising the product obtained by contacting:
 (i) the solid catalyst component according to claim 1;
 (ii) an alkylaluminum compound and optionally,
 (iii) an external electron donor compound.

14. The catalyst according to claim 13, wherein the external donor compounds are selected from the group consisting of silicon compounds of formula $(R_7)_a(R_8)_b Si(OR_9)_c$, where a and b are integers from 0 to 2, c is an integer from 1 to 4 and the sum (a+b+c) is 4; $R_7$, $R_8$, and $R_9$, are radicals with 1-18 carbon atoms optionally containing heteroatoms.

15. A process for the polymerization or copolymerization of olefins CH2=CHR, wherein R is hydrogen or a hydrocarbyl radical with 1-12 carbon atoms, carried out in the presence of a catalyst system according claim 1.

* * * * *

UNITED STATES PATENT AND TRADEMARK OFFICE
CERTIFICATE OF CORRECTION

| | | |
|---|---|---|
| PATENT NO. | : 11,407,844 B2 | Page 1 of 1 |
| APPLICATION NO. | : 17/312264 | |
| DATED | : August 9, 2022 | |
| INVENTOR(S) | : Mignogna et al. | |

It is certified that error appears in the above-identified patent and that said Letters Patent is hereby corrected as shown below:

In the Claims

In Column 12, Claim 15, Line 23, delete "polymerization" and insert -- homopolymerization --, therefor.

In Column 12, Claim 15, Line 26, after "according" insert -- to --.

Signed and Sealed this
Twenty-third Day of January, 2024

*Katherine Kelly Vidal*

Katherine Kelly Vidal
*Director of the United States Patent and Trademark Office*